US010343752B2

(12) United States Patent
Ferronato

(10) Patent No.: US 10,343,752 B2
(45) Date of Patent: Jul. 9, 2019

(54) INTEGRATED ILLUMINATION AND SIGNALING SYSTEM FOR NAVIGATION PURPOSES, METHOD FOR INTEGRATING ILLUMINATION AND SIGNALING FOR NAVIGATION PURPOSES, AND DEVICE INTEGRATING ILLUMINATION AND SIGNALING FOR NAVIGATION PURPOSES

(71) Applicant: Elio José Ferronato, São José (BR)

(72) Inventor: Elio José Ferronato, São José (BR)

( * ) Notice: Subject to any disclaimer, the term of this patent is extended or adjusted under 35 U.S.C. 154(b) by 0 days.

(21) Appl. No.: 15/759,004

(22) PCT Filed: Jan. 3, 2017

(86) PCT No.: PCT/BR2017/050001
§ 371 (c)(1),
(2) Date: Mar. 9, 2018

(87) PCT Pub. No.: WO2017/117643
PCT Pub. Date: Jul. 13, 2017

(65) Prior Publication Data
US 2019/0092436 A1    Mar. 28, 2019

(30) Foreign Application Priority Data

Jan. 9, 2016    (BR) .............................. 102016000494

(51) Int. Cl.
*B63B 45/00*    (2006.01)
*B63B 45/02*    (2006.01)
(Continued)

(52) U.S. Cl.
CPC .............. *B63B 45/00* (2013.01); *B63B 45/02* (2013.01); *B63B 45/04* (2013.01); *B63B 45/06* (2013.01);
(Continued)

(58) Field of Classification Search
CPC ....... G01S 13/86; G01S 13/9307; G08G 3/00; H01Q 1/34; B63B 45/00
See application file for complete search history.

(56) References Cited

U.S. PATENT DOCUMENTS 4,884,173 A    11/1989  Cassidy
5,416,670 A *  5/1995  Authier .................... B60Q 1/26
                                                      114/343
(Continued)

FOREIGN PATENT DOCUMENTS

AU    2012201765 A1    10/2012
WO    2005/026610 A1    3/2005
WO    2015/083046 A1    6/2015

*Primary Examiner* — Stephen P Avila
(74) *Attorney, Agent, or Firm* — Hodgson Russ LLP

(57) ABSTRACT

The invention relates to an integrated illumination and signalling system for navigation purposes integrating a front illumination assembly for the prow, a rear sternlight assembly, an upper anchor light assembly, an illumination assembly at the base of the transparent mast, a signalling assembly also arranged at the rear for illuminating the stern of the vessel, starboard and port side signalling light assemblies pre-arranged in a central longitudinal portion of the vessel, from the center to the rear, preferably on the top frame or a cover of the vessel. The invention also relates to a method for integrating illumination and signalling for nagivation purposes, consisting in a support device combining illumination and signalling and a device integrating illumination and signalling for navigation purposes, comprising a sole plate attached to the vessel, on the top frame, a column or suitable support, with a two-part hull providing an inner support for attaching a radar deflection device(es) a support element for the flag mast and suitably arranged lights and signals on the outside, according to international navigation standards; the hull (1), the fixed sole plate (2), the rear cover (5), the combined support (7), the rod (10), the reflectors (Continued)

(602, 803, 14 and 1401) and the lenses (601, 804, 1402 and 1403) being preferably made of a polymer material protected against UV (ultra-violet) radiation.

24 Claims, 8 Drawing Sheets

(51) Int. Cl.
*B63B 45/04* (2006.01)
*H01Q 1/34* (2006.01)
*G01S 13/93* (2006.01)
*G01S 13/86* (2006.01)
*G08G 3/00* (2006.01)
*B63B 45/06* (2006.01)

(52) U.S. Cl.
CPC .......... *G01S 13/86* (2013.01); *G01S 13/9307* (2013.01); *G08G 3/00* (2013.01); *H01Q 1/34* (2013.01)

(56) References Cited

U.S. PATENT DOCUMENTS

| | | | |
|---|---|---|---|
| 6,019,489 A | 2/2000 | Wiggerman | |
| 6,126,299 A * | 10/2000 | Hypes | B64D 47/06 |
| | | | 362/259 |
| 6,231,217 B1 * | 5/2001 | Krippelz, Sr. | B60Q 1/32 |
| | | | 114/15 |
| 6,499,867 B1 | 12/2002 | Neal | |
| 2002/0044449 A1 * | 4/2002 | von Wolske | B63B 45/00 |
| | | | 362/477 |
| 2005/0237730 A1 * | 10/2005 | Barnes | B60Q 1/32 |
| | | | 362/34 |
| 2006/0016381 A1 | 1/2006 | Schultz | |
| 2007/0165410 A1 | 7/2007 | Rochfort | |
| 2008/0247161 A1 * | 10/2008 | Hulsey | B63B 45/04 |
| | | | 362/227 |
| 2012/0190256 A1 * | 7/2012 | Martzall | B63B 22/166 |
| | | | 441/16 |
| 2014/0056013 A1 * | 2/2014 | Hancock, Jr. | B63B 45/04 |
| | | | 362/477 |
| 2015/0153442 A1 * | 6/2015 | Scott | B63B 45/00 |
| | | | 342/41 |

* cited by examiner

Figure 1
Figure 2
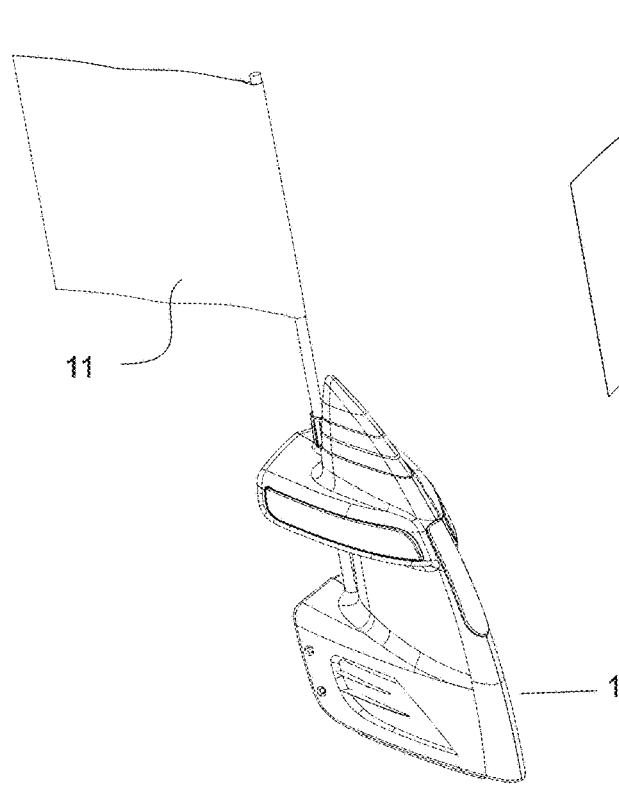
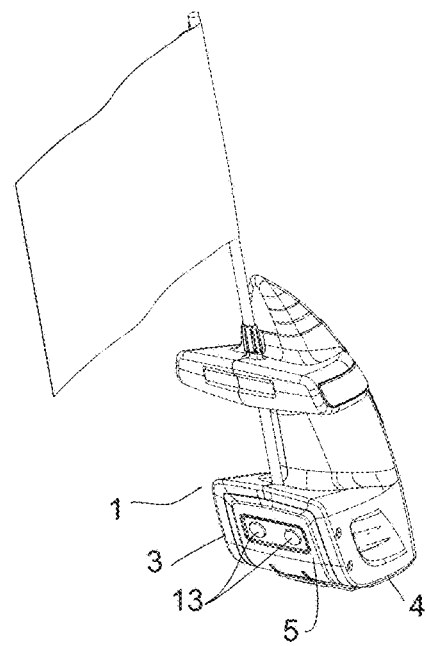
Figure 3
Figure 4
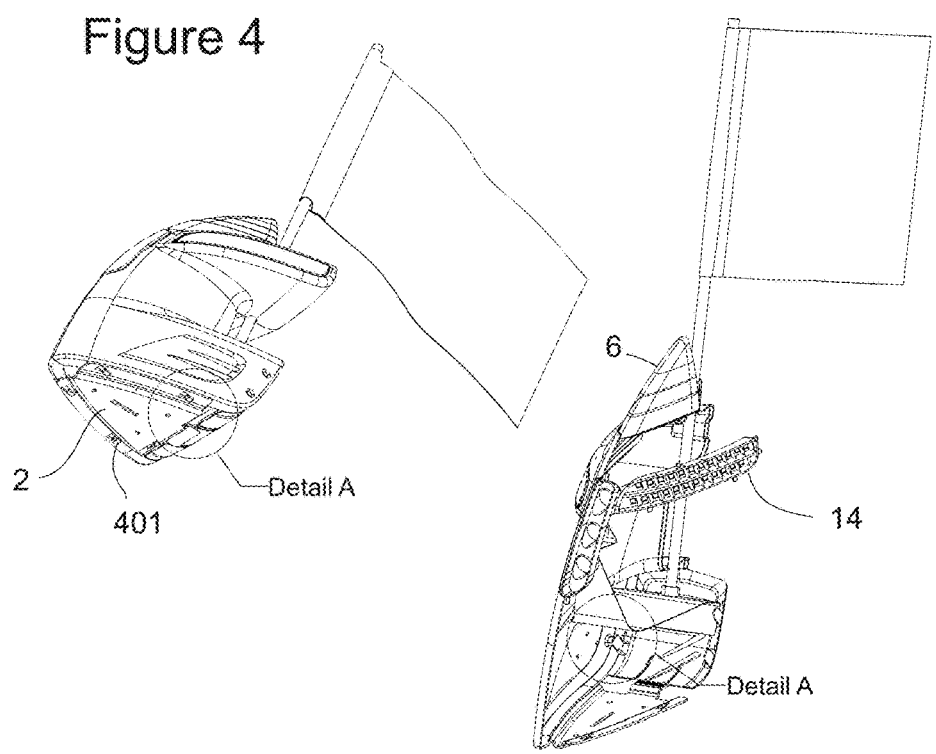

Figure 5
Figure 6
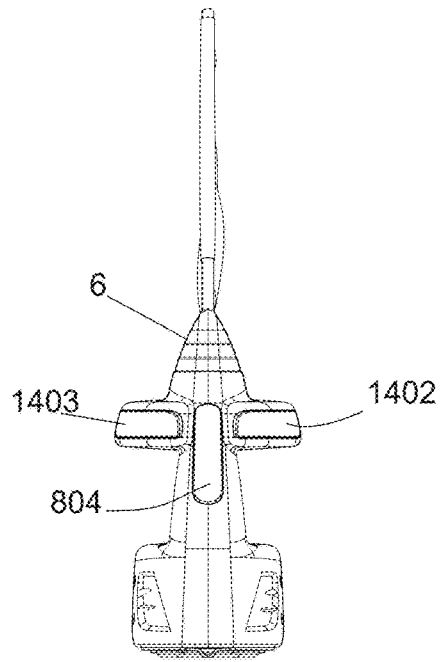
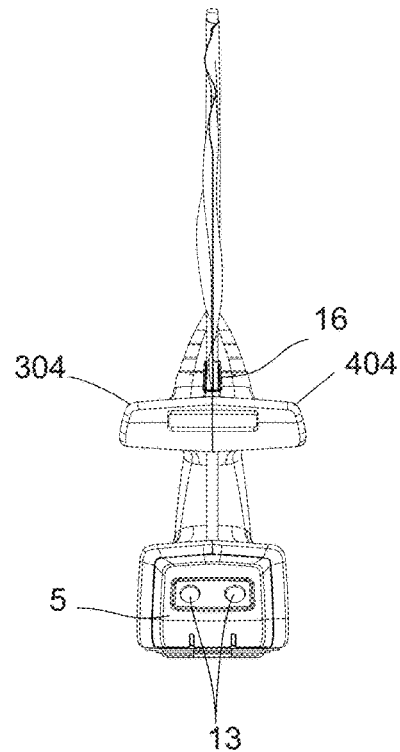
Figure 7
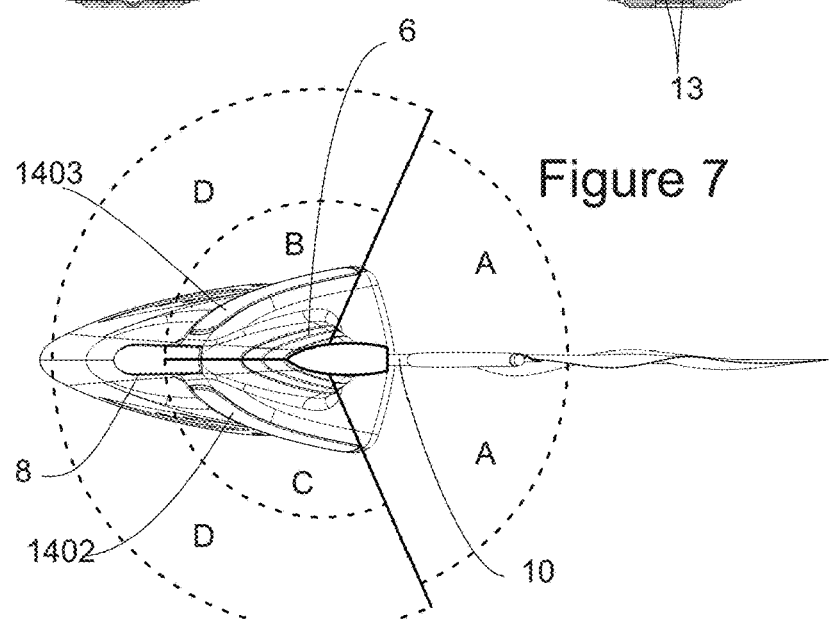
Figure 8
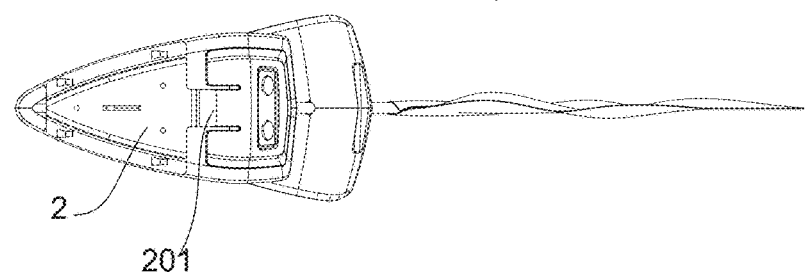

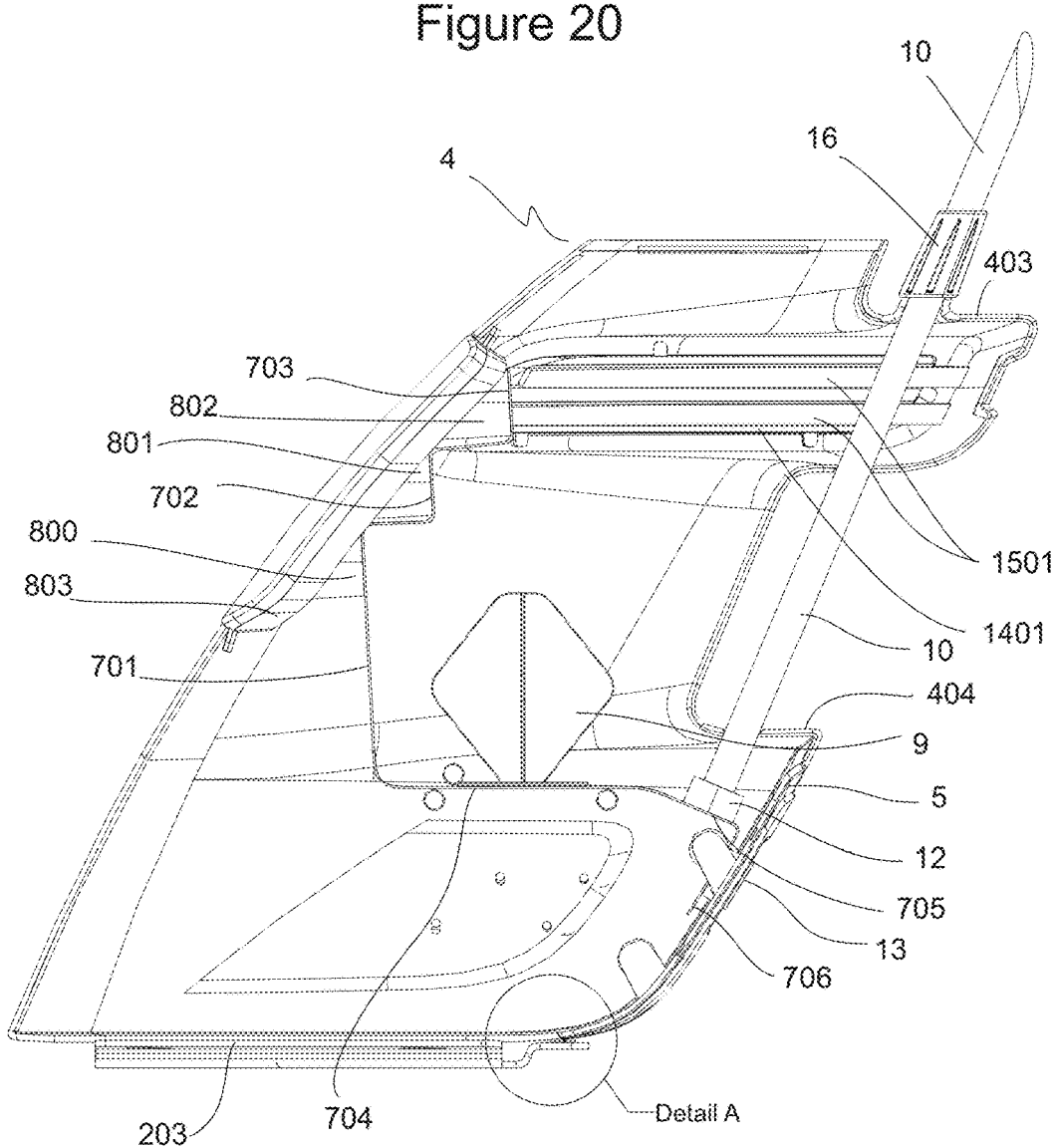
Figure 20
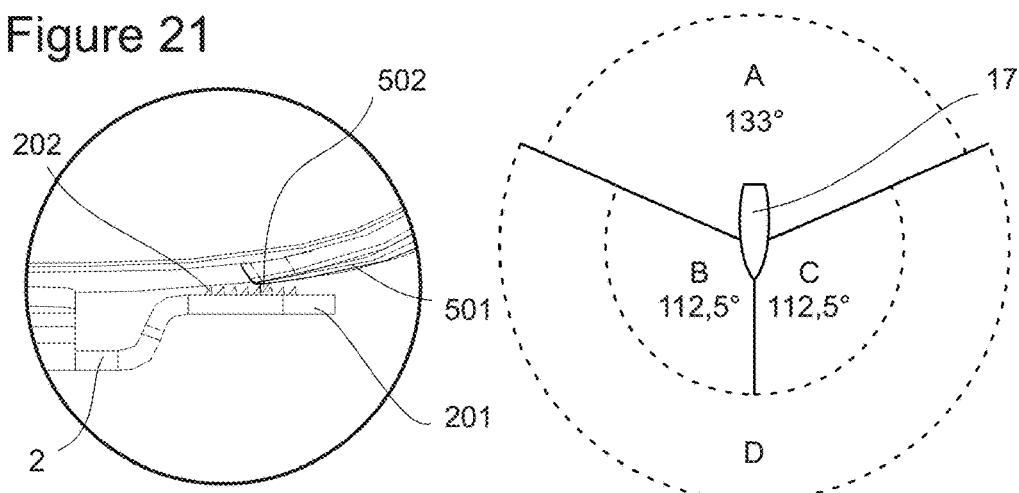
Figure 21
Figure 22

INTEGRATED ILLUMINATION AND SIGNALING SYSTEM FOR NAVIGATION PURPOSES, METHOD FOR INTEGRATING ILLUMINATION AND SIGNALING FOR NAVIGATION PURPOSES, AND DEVICE INTEGRATING ILLUMINATION AND SIGNALING FOR NAVIGATION PURPOSES

FIELD OF THE INVENTION

The present patent of invention relates to the integration of navigation lighting with mandatory signaling for watercraft, grouped in an integrating device, intended for the nautical sector, especially watercraft equipment.

International regulations to prevent collisions at sea, in its rules, advocates that the lights must be displayed from sunrise to sunset and in periods of limited visibility and the sector of visibility of the standard navigation lights regulates that sidelights (green to starboard and red to port): must have a sector of visibility of 112.5°, from the bow to 22.5° abaft the beam of its respective side; the masthead lights (continuous masthead lights) located at the center line of the watercraft must show a sector of visibility of 225° from the bow to 22.5° abaft the beam on both sides of the watercraft; the white light (continuous white sternlight), located as close as possible to the stern, must be visible in a horizontal section of 135°, 67.5° for each side from the stern.

Watercraft signaling requires the study of its construction and purpose. The launch, for example, is a type of watercraft with a planing hull and its operation regime is different from conventional displacement watercraft. Due to the shape of the hull, moderate displacement and engine power range, the watercraft sails sustained by a vertical dynamic pressure which significantly reduces the wet area of the hull. The displacement hulls have limited maximum speed and, from a certain speed, variable according to length of the water line, the hull begins to climb the wave generated by its own movement. This causes lighting and signaling to be impaired in the usual setups.

Some watercraft models are equipped with a top frame, a structural reinforcement of the watercraft, with the purpose of pulling skis or wakeboards, setup for a radio antenna, radar reflector, t, as well a usual place for the setup of watercraft lighting, and also a flag mast.

The watercraft are equipped with devices for sidelights, installed in the hull or ridge; sternlight installed at or near the stern, masthead lights installed on the mast, when present, or on the center line of the watercraft, for example.

Most watercraft have several lighting devices installed at different points of the watercraft, requiring different electrical fixtures for each point, adding costs to any maintenance. Another downside is the setup of canopies on the top frames, for example. Fixed device on this accessory, implies canopy improvisations and even cuts to suit the existing setup.

BACKGROUND OF THE INVENTION AND PRIOR ART

The integration of navigation lights and maritime signaling, radar deflector into a single device does not exist in the current market. Some partial solutions can be found by grouping only the sidelights.

An example of this grouping can be found in patent document n°. WO2005026610, "IMPROVEMENTS IN AND RELATING TO SECTORED LIGHTS", published on Mar. 24, 2005, reporting primary sectored lighting for use in the maritime industry by incorporating LEDs as a light source, distributed to a lens in conjunction with a positive (convex) curve that reflects on the elements and promotes a higher "arc of visibility" with weaker light scattering and accentuating the transition cut.

Although document WO2005026610 claims a device for enlarging the lighting by LED in sectored lights, the grouping has proved relevant to elucidate the technical concept intended in this patent application.

Integrating navigation lighting with marine signaling requires a refined technique, whose method requires the construction of a device having specific properties for such integration.

SUMMARY OF THE INVENTION

Massive research, testing and development were employed in the present device, herein entitled "INTEGRATED LIGHTING AND SIGNALING FOR NAVIGATION PURPOSES, METHOD FOR INTEGRATING LIGHTING AND SIGNALING FOR NAVIGATION PURPOSES AND DEVICE FOR INTEGRATING LIGHTING AND SIGNALING FOR NAVIGATION PURPOSES", and which, in short, refer to INTEGRATED LIGHTING AND SIGNALING FOR NAVIGATION PURPOSES, having a front lighting assembly for the bow, a rear sternlight assembly; an upper anchor light assembly, a lighting assembly at the base of the transparent pole; a signaling assembly also arranged at the rear for stern lighting; starboard and port side signaling light assemblies pre-arranged in a central longitudinal portion of the watercraft, from the center to the rear, preferably on the top frame of the watercraft or a cover; a METHOD FOR INTEGRATING LIGHTING AND SIGNALING FOR NAVIGATION PURPOSES, consisting of a support device combining lighting and signaling; and a DEVICE FOR INTEGRATING LIGHTING AND SIGNALING FOR NAVIGATION PURPOSES, comprising a skid attached to the watercraft, on the top frame, a column or suitable support, having a split hull providing an inner support for attaching a radar deflection device, a support element for the flagmast and suitably arranged lights and signals on the outside, according to international navigation standards.

FIGURES SHOWING THE OBJECT OF THE PATENT APPLICATION

The object of this patent application will be described in details, including with numerical reference joint to the description below, without limiting the proportions, materials and components used in its industrial manufacture, where:

FIGS. 1 to 4 are perspective views, respectively, upper front right, upper rear right, lower front left and lower rear left of the integrating device;

FIGS. 5 and 6 are orthogonal, respectively, front and rear views of the integrating device;

FIG. 7 is an upper orthogonal view of the integrating device, with geometric scheme of the lighting field for comparison with the international standard, shown in FIG. 22;

FIGS. 8 and 9 are orthogonal views, respectively, lower and left side views of the integrating device;

FIG. 20 is an orthogonal side view, with suppression of the left hull and its components, the upper optical assembly and the flag, in order to allow a better understanding of the internal arrangement of the elements;

FIG. 21 is an enlarged view of Detail A reported in FIG. 20, showing the coupling device between the rear cover and the skid;

FIG. 22 shows the geometric scheme of the lighting field in accordance with the international standard;

DETAILED DESCRIPTION OF THE INVENTION

Figure 9:
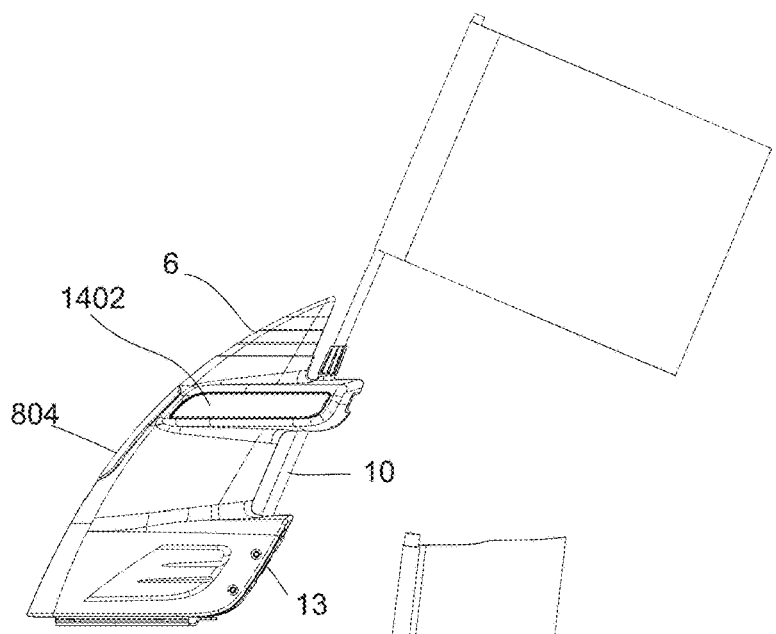
Figure 10:
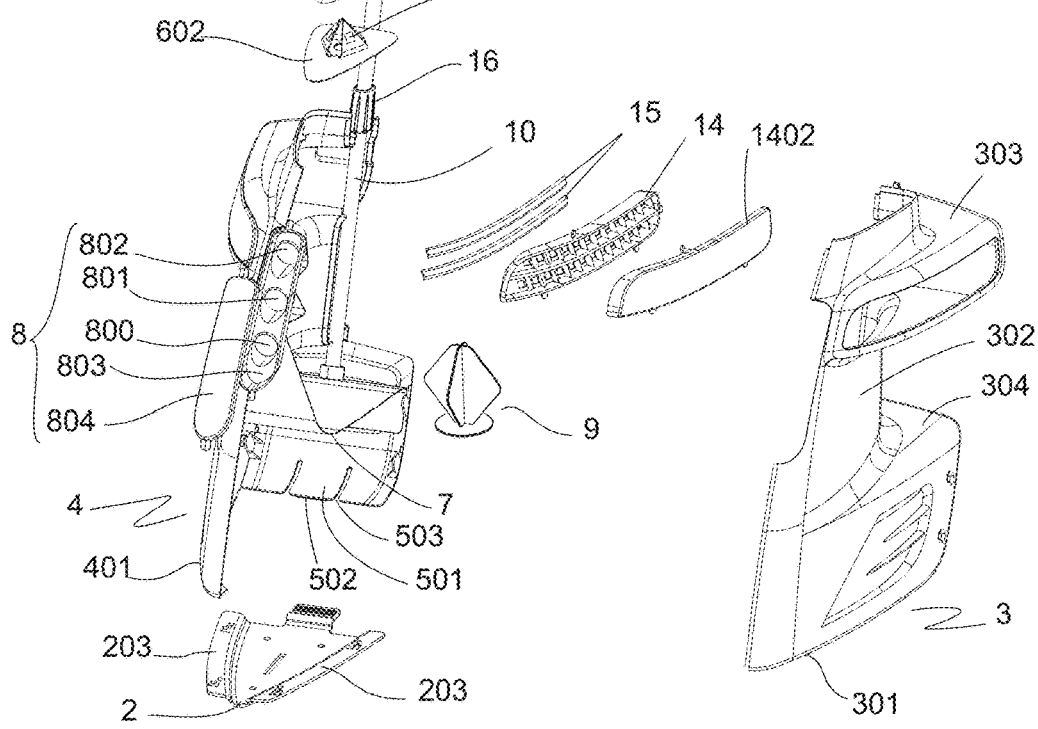
FIG. 10 is a partially exploded view of the integrating device, in upper front left perspective.
Figure 11:
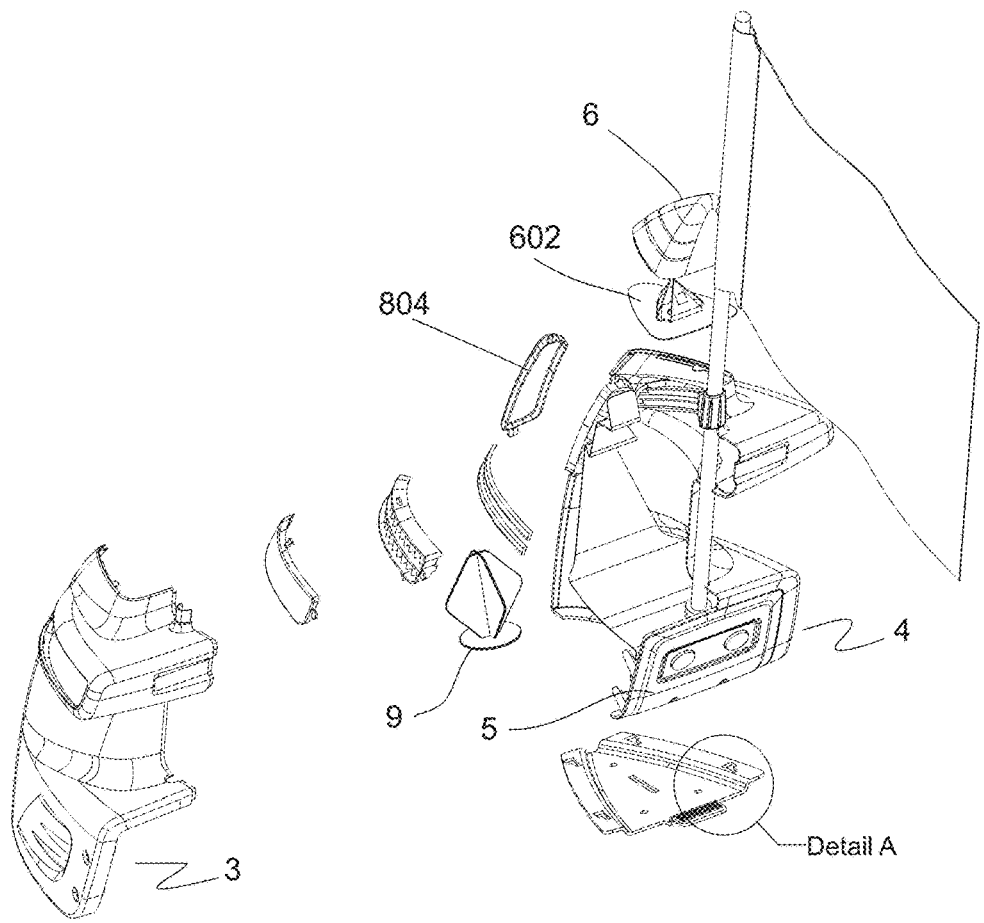
FIG. 11 is a partially exploded view of the integrating device, in upper rear left perspective.
Figure 12:
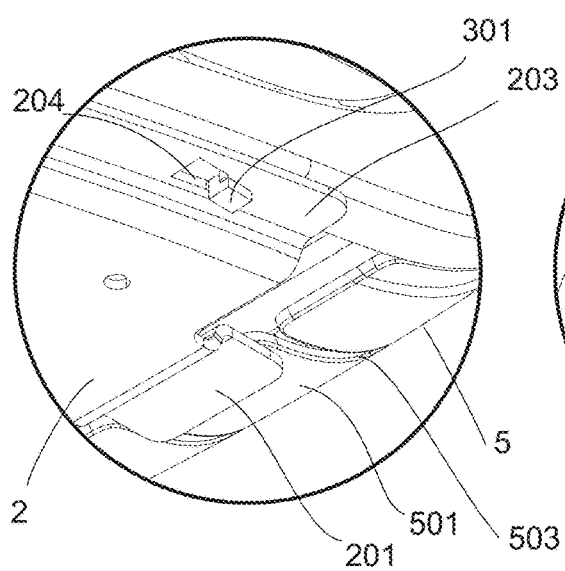
FIG. 12 is an enlarged view of Detail A reported in FIG. 4, showing the coupling device between the skid and the base.
Figure 13:
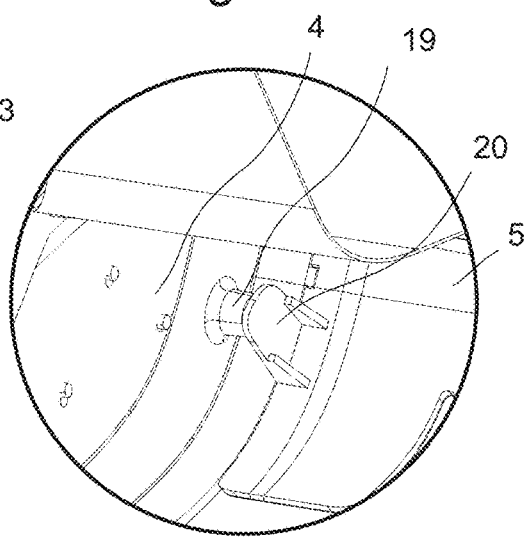
FIG. 13 is an enlarged view of Detail A reported in FIG. 5, showing a coupling mode between the rear hull and the right hull.
Figure 14:
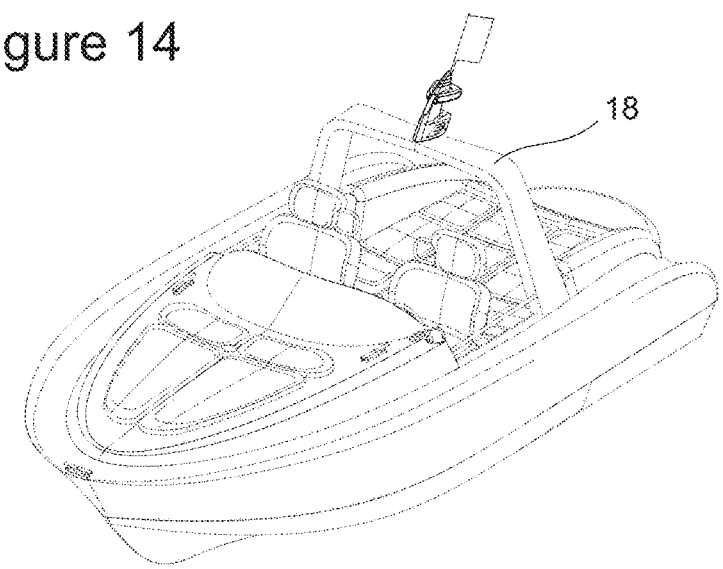
FIGS. 14 and 15 are perspective views, respectively, front and rear ones, of a watercraft having the integrating device mounted on the top frame.
Figure 15:
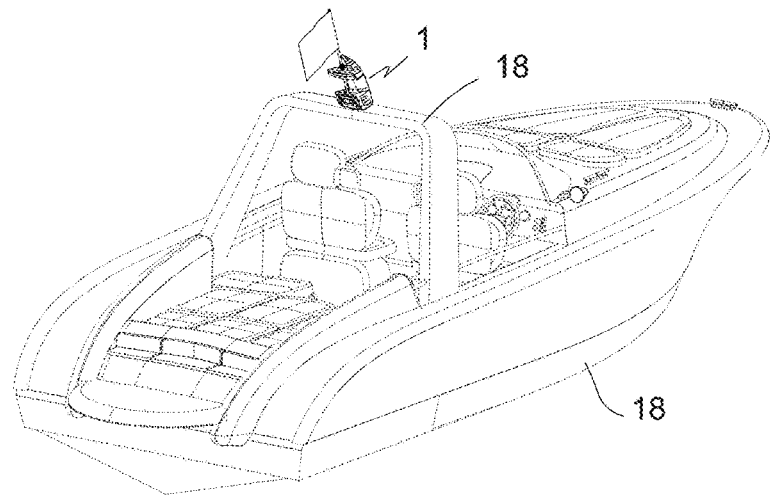
Figure 16:
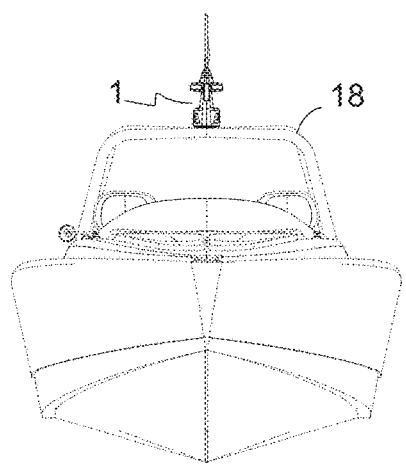
FIGS. 16 and 17 are orthogonal views, respectively, front and rear ones, of a watercraft having the integrating device mounted on the top frame.
Figure 17:
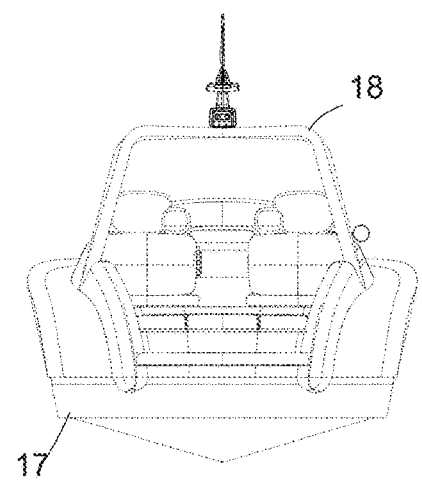
Figure 18:
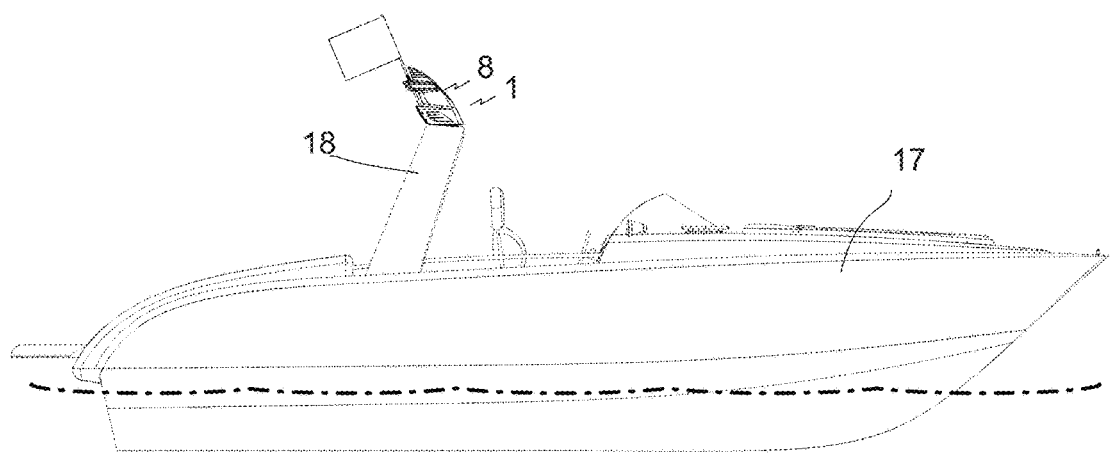
FIG. 18 is an orthogonal side view of a watercraft having the integrating device mounted on the top frame, showing a watercraft anchoring state.
Figure 19:
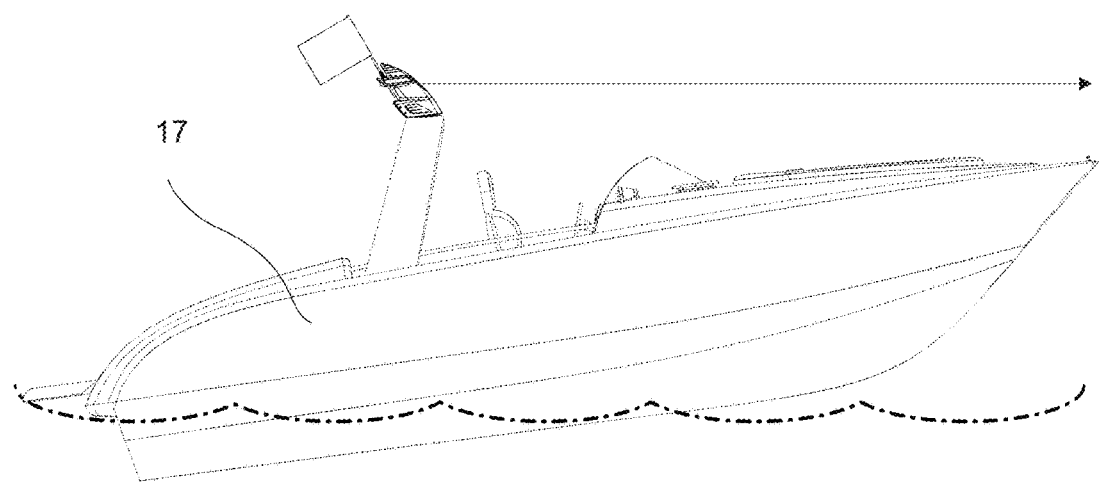
FIG. 19 is an orthogonal side view of a watercraft in displacement showing the front lighting line of the integrating device mounted on the top frame.
Figure 23:
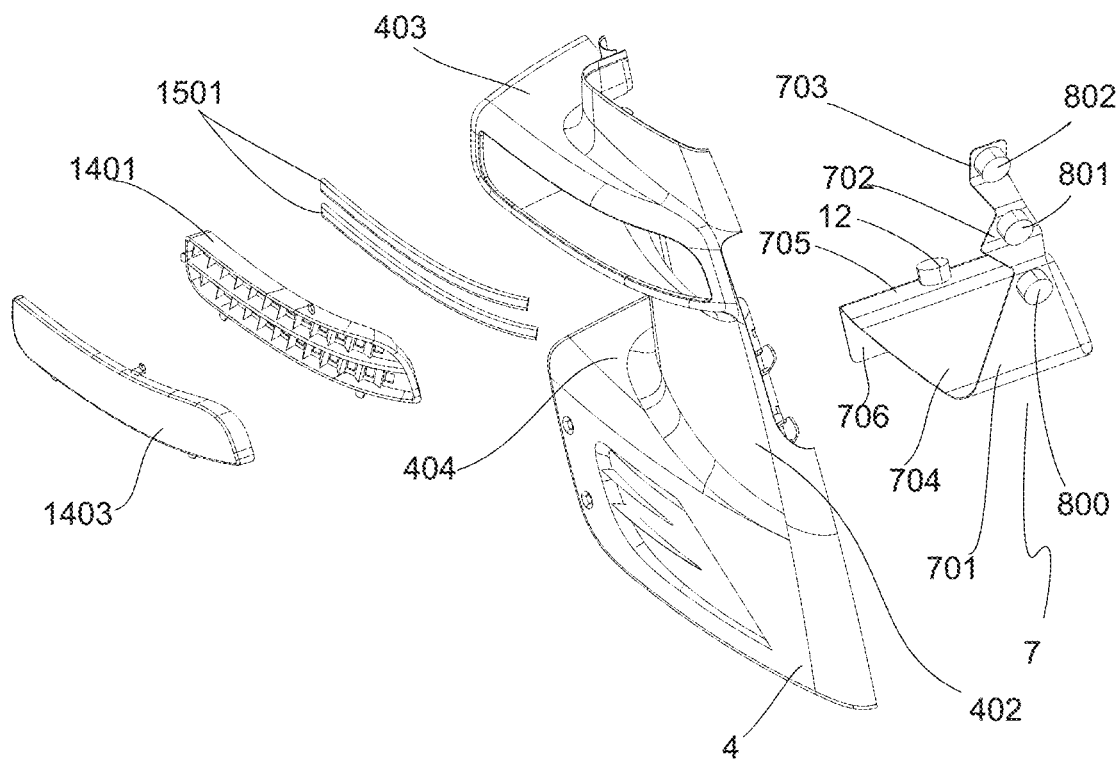
FIG. 23 is a view of the right hull, its signaling components, and the inner support, in upper front right exploded perspective.
Figure 24:
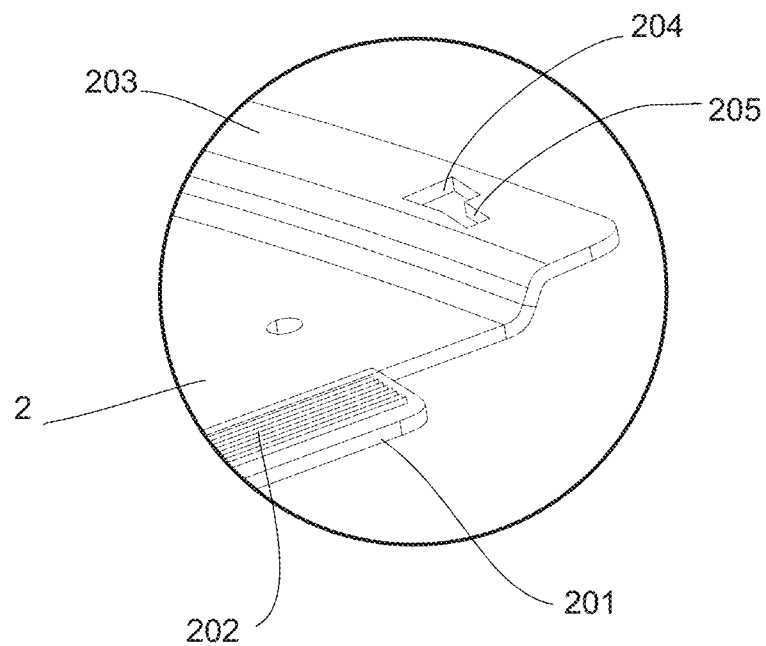
FIG. 24 is an enlarged view of Detail A reported in FIG. 11, showing the latched coupling device between the skid and the hull.

According to the figures listed above, the INTEGRATED LIGHTING AND SIGNALING FOR NAVIGATION PURPOSES, METHOD FOR INTEGRATING LIGHTING AND SIGNALING FOR NAVIGATION PURPOSES AND DEVICE FOR INTEGRATING LIGHTING AND SIGNALING FOR NAVIGATION PURPOSES, object of the present patent application, consists of INTEGRATED LIGHTING AND SIGNALING FOR NAVIGATION PURPOSES, according to FIGS. 7 and 22, having an assembly (8) of three lamps, frontally arranged for bow lighting; a set of two rear lamps (12) for stern lighting (A); at least one upper strobe light for anchoring lighting (A,D); backlight (12) with at least one strobe light at the base of the pole (10) made of acrylic material for flag holder (11); green light signaling assembly (1401) arranged to starboard; red light signaling assembly (14) arranged to port; the integrated lighting and signaling is pre-arranged in a central longitudinal portion of the watercraft (17), from the middle to the rear part, preferably on the top frame (18) of the watercraft or a cover, raising the shaft of height of the lighting source above the lower line of the lighting cone projected above the bow end of the watercraft, as the hull begins to climb the wave—see FIG. 17—generated by its own motion. The integration includes the arrangement in height that provides the effectiveness of lighting and signaling together with the visibility of the flag mast and free of interference to receive signals of radar, in the radar deflector. There is a superior strobe lighting and another at the base of the pole which, depending on the material of the pole, allows refraction by the body thereof. Strobe lighting only flashes in motion, while it does not flash when the watercraft is at anchor —see FIG. 16—being kept on at night.

A METHOD FOR INTEGRATING LIGHTING AND SIGNALING FOR NAVIGATION PURPOSES, consisting of a device (1) having a fixed skid (2), including light assembly for bow lighting (8), preferably in the number of three (3) units (800, 801 and 802), with minimum power of 3 Watts, frontally arranged, interposing the green lighting signaling assembly (1401), arranged to starboard, allowing visualization, being in a position perpendicular to the watercraft, with visibility sector (B) of 112.5°, from bow to 22.5° abaft the beam of its respective side and to the red lighting signaling assembly (14), arranged to port, allowing visualization, being in a position perpendicular to the watercraft, with visibility sector (C) of 112.5°, from bow to 22.5° abaft the beam of its respective side; the support device including strobe lighting (6), superimposed on front lighting (8) and port (14) and starboard (1401) signaling lighting, with visibility sector of 360° for anchoring lighting; the support device includes the light assembly, preferably, in a number of two (2) units, with minimum power of 3 Watts, arranged in the rear part of the middle portion of the width of the support device, for stern lighting (13), with visibility sector of 133°; the support device includes back lights (12), with minimum power of 3 Watts, and a pole (10) made of an acrylic material for the flag holder (13), backlighting the pole (10) and increasing the signaling option for other watercraft.

A DEVICE FOR INTEGRATING LIGHTING AND SIGNALING FOR NAVIGATION PURPOSES, comprising a hull (1) attachable to a fixed skid (2) to be mounted on the top frame (18), column or suitable support of the watercraft (17). In a preferred embodiment, the hull (1) is split, having a left hull (3) and a right hull (4) for interlocking with latches (301/401) attachable to the fixed skid (2). The rear cover (5) can be split, with coupled portions or incorporated into the left (3) and right (4) hull or can be independent, with a monoblock body, also coupled or incorporated into the left (3) and right (4) hulls; said rear cover (5) is formed by a central portion (501), which is flexible due to the rips (503) forming it, having a lower tooth (502) for locking with grooves (202) of the locking device (201) of the fixed skid (2) whose flanges (203) comprise channels (204) with an asymmetric portion (205) for interlocking with latches (301/401) or further integrated pins or bolts, at the lower edge (302/402) of the left hull (3) and right hull (4). The hull (1) is superimposed by the upper headlamp (6) of the anchoring lighting comprising an upper lens (601), an upper reflector (602) and lighting (603) which may be single or multiple, arranged on a triangular support, for example, for lighting at 360°.

Internally, the hull (1) comprises a combined support (7) being shaped with frontal sectors (701, 702 and 703) to support an assembly (8) having sockets and lighting (800, 801 and 802), mounted with a front reflector (803) and front lens (804); moreover, a base sector (704) for a radar deflector device (9), adjacent to a platform sector (705) for the pole (10) of the flag (11) superimposed to the backlights (12) of said pole (10); the combined support (7) is further shaped by the rear sector (706), where sockets and backlight are mounted (13); the side ones, in the upper portion of the hull (1), comprise a reflector support (14 and 1401), having lenses (1402 and 1403) for side signaling (15 and 1501).

In a preferred embodiment, the hull (1) has the plastic shape of a shark fin, flowing aerodynamically and in harmony with the lines of any watercraft (17). The body has an elongated-trunk shape, tapered to the upper lens (601), its base being superimposed by a tapered middle portion (302 and 402) having a protruding portion (303 and 403) to incorporate port and starboard optical signaling assembly and, at the rear part, the middle portion (304 and 404) of the hull (1) juts out, providing a reinforced structure for rear support (16) of the pole (10) of the flag (11), whose lower end extends into the protruding rear portion of the base (304). Preferably, lighting and signaling comprise lamps or an electronic device of the LED type, aiming for lighting economy and efficiency. A fastening means between the single components (3,4 and 5) consists in providing pierced towers (19) in one of the components (3 or 4) coincident with a perpendicular device (20) with a pin in the rear cover (5).

A preferred embodiment for mounting the assembly consists of placing the hull (1) on the front of the fixed skid (2), in such a way that the latches (301/401) are placed in the channels (204) and, by back sliding of the hull (1) on the fixed skid (2), said latches (301/401) are directed towards the asymmetrical portion (205), jointly with the interlocking of the tooth (502) with the groove (202) of the locking device (201) of the fixed skid (2). Electrical wiring is then connected.

The assembly can be electrically interconnected to the fixed skid (2) by means of a flexible cable with connectors or by means of a metal track, coincident by contact sliding. This allows the assembly to be removed easily and quickly, either for withdrawal for maintenance purposes, replacement of the assembly or damaged components, or for preventing weather exposure when not in use.

Such a withdrawal for locking with grooves (202) of the locking device (201) of the fixed skid (2) whose flanges (203) comprise channels (204) with an asymmetric portion (205) for interlocking with latches (301/401) or, the flanges (203) further comprise holes not shown for integral pins or bolts on the lower edge (302/402) of the left hull (3) and the right hull (4).

The dismantling of the assembly consists of disconnection of the electrical wiring, compression displacement of the locking device (201), releasing locking between the tooth (502) and the grooves (202), and then the sliding, opposite the front, on the hull (1), causing the latches (301/401) of the asymmetric portion (205) to be dislodged, placing them in the channels (204), the assembly being lifted, for withdrawal.

In a preferred manufacturing embodiment, the hull (1), the fixed skid (2), rear cover (5), combined support (7), pole (10), reflectors (602, 803, 14 and 1401) and lenses (601,804, 1402 and 1403), are manufactured in polymeric material with UV rays (Ultra Violet) protection.

The invention claimed is:

1. Integrated lighting and signaling for navigation purposes, having a front assembly of lamps for bow lighting; a rear assembly of lamps for stern lighting; upper strobe lighting for anchoring lighting; signaling assembly, arranged at the rear for stern lighting; green signalizing assembly placed to starboard; red signaling assembly placed to port for navigation with watercraft mandatory signaling, intended for the nautical sector, especially for watercraft, characterized in that it comprises an assembly of three lamps (8, 801 and 802) frontally arranged for bow lighting; an assembly of two rear lamps for stern lighting (13); at least one upper strobe light for anchoring lighting (6); pole backlights (12) with at least one strobe lamp at the base of the pole (10); green lamp signaling assembly (1401), arranged to starboard; red lamp signaling assembly (14), arranged to port; comprises pre-arranging all of the aforementioned elements in a central longitudinal portion of the watercraft (17) by raising the height axis of the lighting source above the lower line of the lighting cone projected above the bow end of the watercraft (17), when the hull begins to climb the wave generated by its own movement; comprises a height arrangement which provides for the effectiveness of lighting and signaling (14 and 1401), combined with the visibility of the pole (10) of the flagmast and free of interference to receive radar signals, in a radar deflector (9).

2. The integrated lighting and signaling according to claim 1, characterized in that the pre-arrangement of all signaling and lighting elements takes place from the middle to the rear part of the watercraft (17).

3. The integrated lighting and signaling according to claim 1, characterized in that the pre-arrangement of all the signaling and lighting elements is on the top frame (18) of the watercraft (17); and in that the pre-arrangement of all the signaling and lighting elements is preferably on a cover.

4. The integrated lighting and signaling according to claim 1, characterized in that the pole (10) comprises material enabling the light refraction by the body thereof.

5. The integrated lighting and signaling according to claim 1, characterized in that strobe lighting (6 or 12) flashes when the watercraft (17) moves.

6. The integrated lighting and signaling according to claim 1, characterized in that strobe lighting (6 or 12) remains lit without flashing, when the watercraft (17) is anchored at night.

7. A method for integrating lighting and signaling for navigation purposes according to claim 1, characterized in that it comprises a device (1) having a fixed skid (2), including light assembly for bow lighting (8), frontally arranged, interposing the green lighting signaling assembly (1401), arranged to starboard, allowing visualization, being in a position perpendicular to the watercraft, with visibility sector (B) of 112.5°, from bow to 22.5° abaft the beam of its respective side, and to the red lighting signaling assembly (14), arranged to port, allowing visualization, being in a position perpendicular to the watercraft, with visibility sector (C) of 112.5°, from bow to 22.5° abaft the beam of its respective side; the support device including strobe lighting (6), superimposed on front lighting (8) and port (14) and starboard (1401), with visibility sector of 360° for anchoring lighting; the support device includes sternlights (13), with visibility sector of 135°; the support device includes backlights (12) jointly with a pole (10).

8. The method according to claim 7, characterized in that bow lighting (8) comprises three (3) units (800, 801 and 802), having a minimum power of 3 Watts.

9. The method according to claim 7, characterized in that stern lighting (13) comprises two (2) units, having a minimum power of 3 Watts.

10. The method according to claim 7, characterized in that back lighting comprises a minimum power of 3 Watts.

11. A device for integrating lighting and signaling for navigation purposes according to claim 1, characterized in that it comprises a hull (1) attachable to a fixed skid (2) by means of latches (301/401) attachable to the fixed skid (2); comprises a rear cover (5) formed by a central portion (501), which is flexible due to the rips (503) forming it, having a lower tooth (502) for locking with grooves (202) of the locking device (201) of the fixed skid (2); the hull (1) is superimposed by the upper headlamp (6) of the anchoring lighting comprising an upper lens (601), an upper reflector (602) and lighting (603); the hull (1) comprises a combined support (7) being shaped with frontal sectors (701, 702 and 703) to support an assembly (8) having sockets and lighting (800, 801 and 802), mounted with a front reflector (803) and front lens (804); moreover, a base sector (704) for a radar deflector device (9), adjacent to a platform sector (705) for the pole (10) of the flag (11) superimposed to the backlights (12) of said pole (10); the combined support (7) is further shaped by the rear sector (706), where sockets and backlight are mounted (13); the side ones, in the upper portion of the hull (1), comprise a reflector support (14 and 1401), having lenses (1402 and 1403) for side signaling (15 and 1501); the assembly is electrically interconnected to the fixed skid (2) by means of a flexible cable with connectors.

12. The integrating device according to claim 11, characterized in that the hull (1) is attachable to a fixed skid (2); the fixed skid (2) is mounted on the top frame (18) or column or suitable support of the watercraft (17).

13. The integrating device according to claim 11, characterized in that the hull (1) is split, originating a left hull (3), a right hull (4) and a rear cover (5).

14. The integrating device according to claim 11, characterized in that the hull (1) comprises latches (301/401) attachable to the fixed skid (2).

15. The integrating device according to claim 11, characterized in that the rear cover (5) is split, with portions coupled to either the left (3) or right (4) hull; the rear cover (5) is split, with portions incorporated to the left (3) and right (4) hulls; the rear cover (5) is independent, having a monoblock body coupled to either the left (3) or right (4) hull; the rear cover (5) is independent, having a monoblock body, incorporated into the left (3) and right (4) hulls.

16. The integrating device according to claim 11, characterized in that the fixed skid (2) comprises flanges (203) with channels (204) having an asymmetrical portion (205) for interlocking with latches (301/401); comprises flanges (203) with interlocking by integrated pins; or comprises flanges (203) with bolt interlocking; the flanges (203) comprises holes.

17. The integrating device according to claim 11, characterized in that anchoring lighting (603) comprises a single lamp; anchoring lighting (603) comprises multiple lamps; or anchoring lighting (603) comprising multiple lamps arranged on a triangular support.

18. The integrating device according to claim 11, characterized in that the hull (1) has the plastic shape of a shark fin, elongated-trunk, tapered to the upper lens (601), its base being superimposed by a tapered middle portion (302 and 402) having a protruding portion (303 and 403) and, at the rear part, the middle portion (304 and 404) of the hull (1) juts out, providing a reinforced structure for rear support (16) of the pole (10) of the flag (11), whose lower end extends into the protruding rear portion of the base (304).

19. The integrating device according to claim 11, characterized in that lighting and signaling comprise lamps, and wherein the lighting and signaling comprise an electronic device of the LED type.

20. The integrating device according to claim 11, characterized in that the assembly is electrically interconnected to the fixed skid (2) by means of a metal track, coincident by contact sliding.

21. The integrating device according to claim 11, characterized in that the left hull (3) and the right hull (4) internally comprise pierced towers (19).

22. The integrating device according to claim 11, characterized in that the rear cover (5) comprises a perpendicular device (20) with a pin.

23. The integrating device according to claim 11, characterized in that the hull (1), the fixed skid (2), the rear cover (5), the combined support (7), the pole (10), the reflectors (602, 803,14 and 1401) and the lenses (601, 804, 1402 and 1403) are fabricated of a polymeric material.

24. The integrating device according to claim 23, characterized in that the polymeric material comprises UV (Ultra Violet) protection.

\* \* \* \* \*